July 24, 1962  R. W. HOUSER  3,046,375
CONTROL DEVICE

Filed June 3, 1959  3 Sheets-Sheet 1

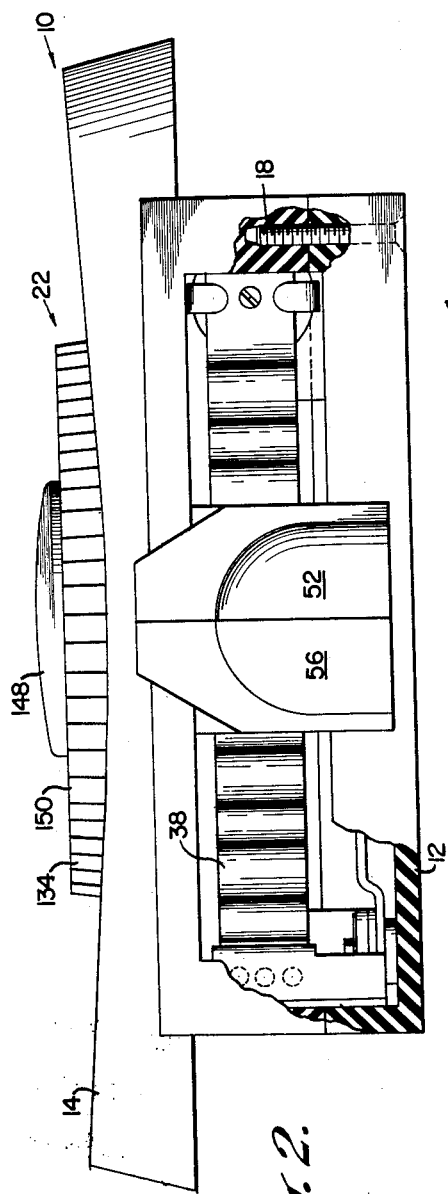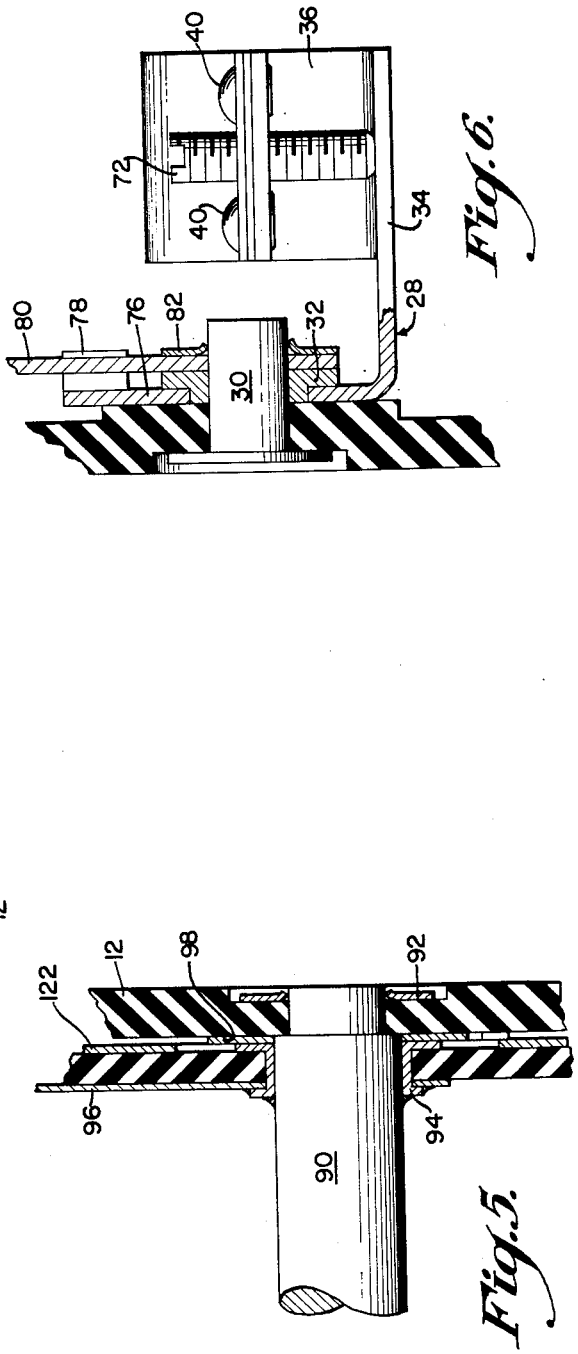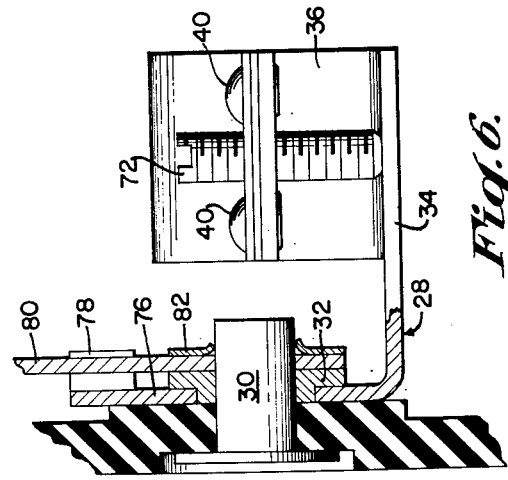

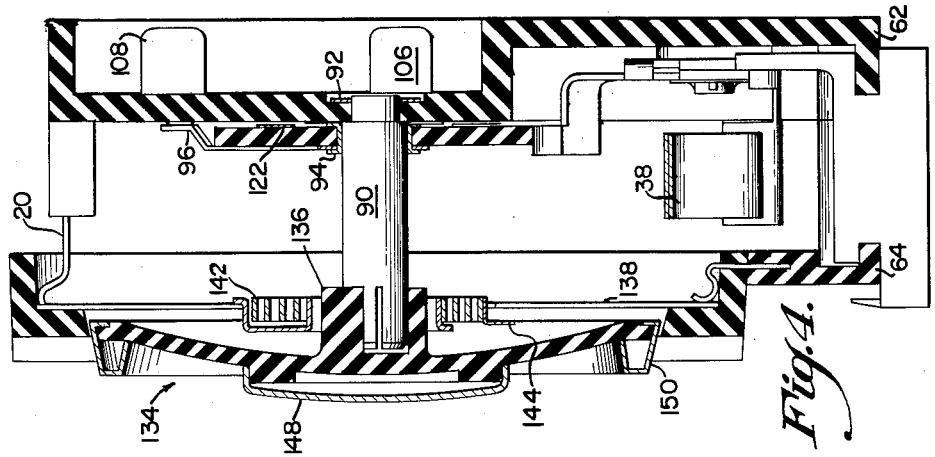
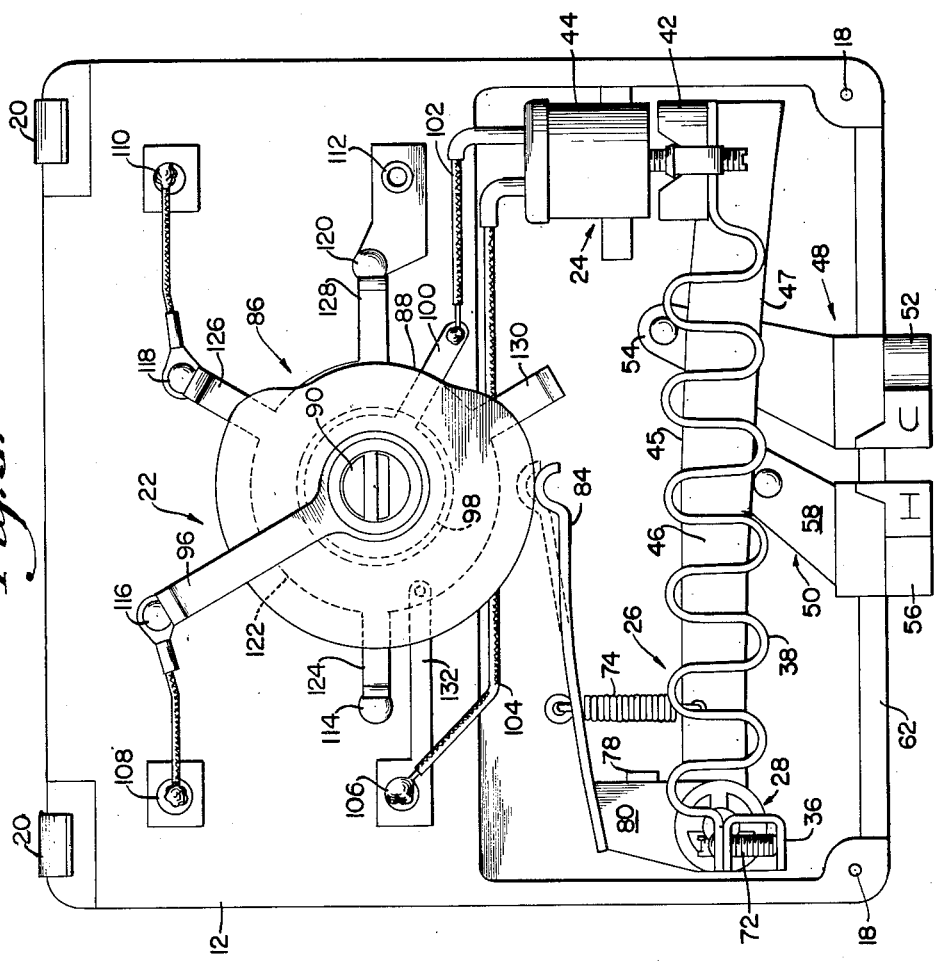

even in recent devices operation is difficult and confusing since one means has been provided to select the desired appliance and another means has been required to set the control point of the thermostat.

3,046,375
CONTROL DEVICE
Roy W. Houser, Anaheim, Calif., assignor to Robertshaw-Fulton Controls Company, Richmond, Va., a corporation of Delaware
Filed June 3, 1959, Ser. No. 817,752
14 Claims. (Cl. 200—138)

This invention relates to devices for controlling the operation of a plurality of appliances, such as room air heaters, room air coolers, and fans. More particularly, this invention concerns thermostats and means for changing the control point and circuit connections of thermostats.

It has been customary to control room air heaters, room air coolers, and fans by separate thermostats. The thermostats include switch means and temperature responsive power elements. When a thermostat is employed to control a heater, decrease in room temperature causes the power element to actuate the thermostat switch and thereby force the heater to supply the room with warmer air. When the thermostat is employed to control a cooler, increase in room temperature causes the power element to actuate the thermostat switch and thereby force the cooler to supply the room with cool air. When a thermostat is employed to control a fan, increase in room temperature causes the power element to actuate the thermostat switch and thereby force the fan to circulate the room air.

Recently, attempts have been made to construct a single thermostat which is capable of controlling a plurality of appliances. However, this has resulted in the production of bulky and expensive controls. Furthermore, even in recent devices operation is difficult and confusing since one means has been provided to select the desired appliance and another means has been required to set the control point of the thermostat.

Therefore, an object of this invention is to selectively control a plurality of control devices in a simple and inexpensive manner.

Another object of this invention is to select the desired appliance and also the set point of a thermostat in a single movement and according to a predetermined plan.

Still another object of this invention is to easily and accurately read and adjust dual control points on a linear scale outside the thermostat casing.

In the preferred embodiment of this invention, a support is provided with a plurality of contacts disposed thereon, each being adapted for connection to a separate appliance such as an air conditioner, a heater, or a fan. Adjusting means is pivotally mounted on the support and includes an outwardly extending curved portion having upper and lower involute surfaces. A pair of abutment means is mounted for rectilinear movement on the support and each abutment means includes a pointer for indicating a temperature on a single linear scale disposed on the support. One of the abutment means is adapted for engagement with the upper surface of the curved portion and the other of the abutment means is adapted for engagement with the lower surface of the curved portion.

A temperature responsive power element is carried by the adjusting means and is operatively connected to a switch means to cause operation thereof. Selecting means is provided for engagement with one of the plurality of contacts to place the desired appliance in circuit with the switch means. The selecting means includes cam means which is resiliently connected to the adjusting means and moves the same to cause engagement of the curved portion thereof with one of the abutment means upon movement of the selecting means to one position. Movement of the selecting means to another position causes engagement of the curved portion with the other abutment means. This movement of the adjusting means varies the position of the power element thereby determining the temperature at which the power element will operate the switch means. Each abutment means is rectilinearly movable on the support to limit the movement of said power element to any desired position.

These and other objects and advantages of this invention will become apparent from the following detailed description taken in connection with the accompanying drawings wherein:

FIG. 2 is a bottom plan of the device shown in FIG. 1 with a portion cut away;

FIG. 3 is a view similar to FIG. 1 but with the cover removed;

FIG. 4 is a cross section taken on lines IV—IV, of FIG. 1; and

FIGS. 5 and 6 are enlarged partial sectional views of details of the control device.

Figure 1:
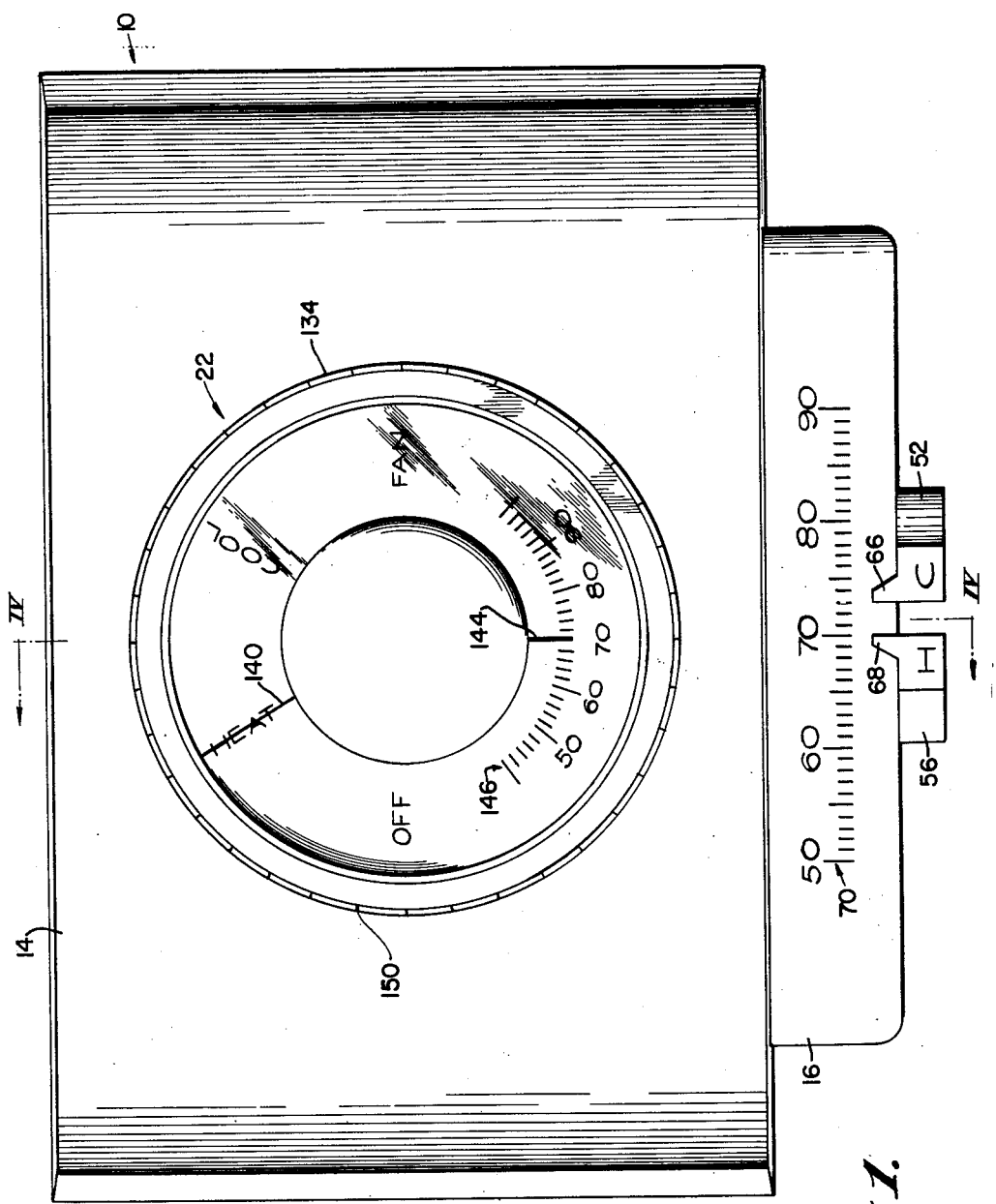
FIG. 1 is a front elevation of a control device embodying this invention.

Referring more particularly to the drawings, a control device indicated generally at 10 comprises a substantially square base or support 12 having a rectangular cover 14 of plastic or other suitable material extending slightly beyond two sides of the support 12. A smaller lower face 16 is disposed adjacent a long side of the cover and extends over the lower portion of support 12. The lower face 16 is fastened to the support 12 by a pair of screws 18 extending through the support 12 and into the lower face 16 as best shown in FIG. 2. A pair of spring clips 20 extend from the top of support 12 and resiliently engage the inner portion of the cover 14 to hold the same in place.

Selecting means 22 is provided on support 12 and is operable to connect a selected external circuit (not shown) to a thermostatically operated switch means 24. Adjusting means 26, which is also operable by selecting means 22 as will appear hereinafter, is adapted to vary the control or set point temperature of the thermostatically operated switch means 24.

The adjusting means 26 takes the form of a bracket 28 pivotally mounted by means of a low friction washer 32 (FIG. 6) on a pin 30, which extends through the lower left hand corner of support 12. The bracket 28 comprises a leg 34 extending outwardly from the support 12 and terminating in a U-shaped portion 36 in a plane parallel to the support 12.

A sinusoidal-shaped bimetallic temperature responsive power element 38 is attached to the U-shaped portion 36 by rivets 40 and extends substantially across the width of support 12. A magnet element 42 is secured to the free end of the bimetallic power element 38 and is cooperable with a switch member 44 so that when the magnet element 42 is moved to a predetermined position, the contacts (not shown) of the switch member 44 will suddenly close. Conversely, the switch 44 snaps open when magnet element 42 is retracted beyond this critical position. The foregoing description of the switch means is deemed sufficient since the details of the switch do not form a part of this invention. Any type of switch may be used, magnetic or otherwise, the only requirement being that the control point of the switch be dependent upon the specific position of the free end of the bimetallic power element 38.

The angular position of the fixed end of the bimetallic element 38 determines the temperature at which the bimetallic element will have exactly the correct curvature to place the magnet element 42 at the critical position to operate the switch means 24. Thus, the inclination of the fixed end of the bimetallic element 38 can be translated into the temperature set point for the thermostat. To this end, the bracket 28 includes a long, slender curved portion 46 extending substantially parallel to the sinusoidal-shaped bimetallic power element 38. The curved portion 46 is provided with an upper involute surface 45 and a lower involute surface 47. Rotation of bracket 28 is limited by a plurality of abutment means 48, 50 which are slidably mounted for rectilinear movement on a track formed across the bottom of support 12. Abutment means 48 comprises a manually operable knob 52 having an angular extension 54 behind and over the top of the curved portion 46 for engagement with the upper involute surface 45 to limit counterclockwise rotation of bracket 28. Abutment means 50 comprises a manually operable knob 56 having a shorter angular extension 58 which terminates beneath the curved portion 46 and is adapted to engage the lower involute surface 47 to limit clockwise rotation of bracket 28.

The track for the abutment means 48 and 50 takes the form of an outwardly extending flange 62 which cooperates with grooves formed on the inner end of knobs 52, 56. The outer ends of knobs 52, 56 are also formed with grooves which cooperate with an inwardly extending flange 64 formed on the lower face 16. Pointers 66 and 68 are formed integral with knobs 52, 56, respectively, and extend over the lower face 16 to indicate a temperature on a linear scale 70 disposed across the lower face 16. It is apparent that by sliding the abutment means 48 or 50 laterally along track 62, 64 rotation of bracket 28 may be limited to set the control point temperature of the switch means 24 at any desired value.

Means is provided to calibrate the thermostat so that when the curved portion 46 of the bracket 28 engages a particular abutment means 48 or 50, the bimetallic power element 38 will operate the switch means 44 at the temperature indicated by that particular pointer 66 or 68. More particularly, a screw 72 extends through a leg of the U-shaped portion 36 of bracket 28 and abuts against the other leg of the U-shaped portion. Rotation of the screw 72 in the appropriate direction will either compress or spread apart the legs of the U-shaped portion 36 thereby varying the fixed angular relation between the bimetallic power element 38 and the curved portion 46 of bracket 28.

A relatively weak coil spring 74 has one end attached to the support 12 and the other end hooked in an aperture formed in the curved portion 46 to constantly urge pivotal movement of the same into engagement in a counterclockwise direction about pin 30 and with abutment means 48. To overcome the bias of coil spring 74 and move the curved portion 46 into engagement with abutment means 50, the bracket 28 is provided with an arm 76 extending substantially perpendicular to the curved portion 46 and to the leg 34. The arm 76 is provided with a lug 78 extending parallel to the leg 34 and adapted for engagement with a follower 80 which is also pivotally mounted on pin 30. A retainer 82 holds the low friction washer 32 and the follower 80 in place on pin 30. The follower 80 includes an angularly extending leaf spring portion 84 having a hook-shaped end engaging a cam means 86 disposed centrally on support 12. The leaf spring 84 is stronger than coil spring 74 so that the bracket 28 is pivoted in a clockwise direction about pin 30 against the bias of coil spring 74 to move the curved portion 46 into engagement with abutment means 50 as shown in FIG. 3.

The cam means 86 forms part of a selecting means 22 and includes a generally circular switch rotor of plastic or other suitable material having an indentation 88. The indentation is of sufficient depth so that when the hook-shaped end of the follower 80 communicates therewith upon rotation of the rotor, the bracket 28 is pivoted in a counterclockwise direction under the bias of coil spring 74 until the curved portion 46 engages abutment means 48.

A shaft 90 is provided with a reduced end portion extending through the central portion of support 12 and is held in pivotal relationship therewith by a retainer 92. The shaft 90 extends outwardly from the support 12 and through an aperture disposed centrally in the cam means 86. The cam means 86 which is composed of plastic material and the shaft 90 of brass are held together by a metallic collar 94 which is welded to the shaft (FIG. 5). A switch blade 96 is soldered to the collar 94 so an electrical connection is made with a center contact plate 98 which is fixedly mounted on the support 12 and slidably engages collar 94. The contact plate 98 is provided with an outwardly extending arm 100 which is connected to switch member 44 by a wire 102. Another wire 104 connects the switch member 44 with one contact 106 of a plurality of mounting contacts 106, 108, 110, and 112, which are disposed about the cam means 86 and extend through the support 12.

Each mounting contact 106, 108, 110, and 112 is adapted to be connected to a specific external circuit. In the present illustration mounting contact 106 is connected to an appropriate power source; whereas, mounting contacts 108, 110, and 112 are connected to circuits containing heating means, an air conditioner, and a fan, respectively. Switch contacts 114, 116, 118, and 120 are disposed on support 12 adjacent the mounting contacts 106, 108, 110, and 112, respectively, and are adapted to be engaged by the switch blade 96. Switch contacts 116, 118, and 120, are electrically connected to their respective mounting contact, whereas, switch contact 114 is not further connected and is the "off" position of the control.

A consideration of the use of a thermostat to control both a heating means and an air conditioner indicates that the air conditioner requires a reverse acting relay if the heating means is direct acting in response to the thermostat switch. In this case, connecting the thermostat switch to the heating means opens the circuit to the air conditioner relay and causes the air conditioner to operate continuously unless a means of automatically closing this relay is provided. A circulating fan, having an action similar to the air conditioner, also requires the reverse acting relay, and similar provision for automatically closing this relay must be provided.

In the present illustration, the means of closing these relays is provided by a commutator ring 122 having four arms 124, 126, 128, and 130. The commutator ring 122 is mounted on the bottom of the cam means 86 and is radially spaced from the contact plate 98 for insulation therefrom. Power is supplied to this ring from an extension 132 of mounting contact 106, the power inlet. The extension 132 rides on the commutator ring 122. The arms 124, 126, 128, and 130 are designed to apply power to the air conditioner contact 118 and the fan contact 120 at all positions of the cam means 86 except when switch blade 96 is on the particular contact 118 or 120. To prevent applying power to the heating means contact 116, this contact is mounted at a greater distance from the shaft 90 than the other contacts 114, 118, and 120, and the commutator arms 124, 126, 128, and 130, are not long enough to contact it. However, the switch blade 96 is longer than the commutator arms and will engage all of the contacts 114, 116, 118, and 120. The preceding is merely illustrative of one of the many ways that automatically closing these relays can be accomplished.

Manually operable means is attached to shaft 90 for causing rotation of the same and consequent operation of cam means 86 and switch blade 96. More particularly, the cover 14 is provided with a centrally disposed opening which receives a circular selector dial 134 of transparent plastic material. A centrally bored boss 136 extends inwardly from beneath the medial portion of dial 134 and is rigidly fitted on the outer end of shaft 90. An indicia plate 138 is fixed within the cover 14 and extends beneath the transparent selector knob 134. The indicia "off," "heat," "cool," and "fan," are disposed on the indicia plate 138 and a reference line 140 provided on the transparent selector dial is cooperable therewith to indicate the position of the switch blade 96 The central portion of the indicia plate 138 is apertured and one end of a conventional spiral temperature indicating bimetal 142 is attached to the plate. The bimetal indicator 142 is disposed about boss 136 and an indicator 144 attached to the free end of bimetal 142 cooperates with an appropriate temperature scale 146 also disposed on the indicia plate 138. A decorative circular clip 148 is disposed on the selector dial 134 and overlies the indicating bimetal 142 so that only the indicator 144 is externally visible. The circumferential portion of the selector dial 134 is provided with serrations 150 to facilitate manual operation of the same.

In operation, when the selector dial 134 is in a position such that reference line 140 overlies the "off" designation, the switch blade 96 will engage switch contact 114. Since contact 114 is not further connected, the thermostatic circuit will be open and the control device 10 will be inoperative. The knobs 52, 56 are moved rectilinearly along scale 70 to any desired setpoints, such as those shown in FIG. 1 wherein knob 56 is set at 70° and knob 52 is set at 73°.

Assuming there is a desire for heat, selector knob 134 is rotated until reference line 140 overlies the designation "heat." This rotation moves switch blade 96 from switch contact 114 into engagement with switch contact 116 and places a heating means (not shown) in circuit with the thermostatically operated switch means 24 as follows: current flows from the power inlet 106 through wire 104, switch member 44, wire 102, arm 100, center contact plate 98, collar 94, switch blade 96, switch contact 116, mounting contact 108, and to the external circuit containing the heating means. The setpoint of the thermostatically operated switch means 24 will be 70° since the leaf spring 84 of follower 80 is in engagement with a rotor so that the adjusting means 26 is pivoted in a clockwise direction against the action of coil spring 74 until the curved portion 46 engages abutment means 50.

When the selector dial 134 is rotated in the clockwise direction to move reference line 140 over the designation "cool," the thermostat is placed in circuit with an air conditioner. In this case, current flows from the power inlet 106 to the switch blade 96 in the manner above described but since the switch blade 96, having rotated with selector knob 134, is now in engagement with switch contact 118, current will flow from the switch blade 96 through switch contact 118 and mounting contact 110 to the external circuit containing the air conditioner. Also, as a result of rotation of the dial from "heat" to "cool," the setpoint of the thermostatically operated switch means 24 has automatically changed to 73° as the leaf spring 84 of follower 80 has moved into the indentation 88 and the adjusting means 28 has pivoted in a counterclockwise direction under the bias of coil spring 74 until curved portion 46 engages abutment means 48. The difference of temperature setpoints allows a comfort zone in which neither the heating means nor the air conditioner is required to operate.

If it is desired to have both the heating means and the air conditioner off, and yet have a circulating fan operate under temperature control, the selector dial 134 is rotated until reference line 140 overlies the designation "fan." This rotates the selector blade 96 into engagement with switch contact 120 and current will now flow from the switch blade 96 through switch contact 120 and mounting contact 112 to the external circuit containing the fan. The leaf spring 84 of follower 80, being still in the indentation 88, keeps the setpoint of the switch means at 76°.

The leaf spring 84 providing a resilient connection between the cam means 86 and adjusting means 26 renders the manufacturing tolerances of the cam means 86 uncritical.

The curved portion 46 having upper and lower involute surfaces 45, 47, makes it possible for the abutment means 48 and 50 to indicate their control point temperature on a single linear scale 70.

Many variations of this invention are readily seen. For instance, on thermostats of the "day and night" type, this invention would allow a single knob control, including the "off" position and, if desired, a "fan" only position. Therefore, it is apparent that there may be many changes in structure and operation without departing from the scope of this invention as defined by the appended claims.

I claim:

1. In a control device, the combination comprising a support having adjusting means movably attached thereto, a temperature responsive power element carried by said adjusting means, switch means operatively connected to said power element and operable thereby, means movably mounted on said support and operatively connected to said adjusting means for causing movement thereof, and means mounted for rectilinear movement on said support and engaging said adjusting means to limit the movement thereof to a predetermined position thereby setting the temperature at which said power element operates said switch means.

2. In a control device, the combination comprising a support having adjusting means pivotally mounted thereon, a temperature responsive power element carried by said adjusting means, switch means operatively connected to said power element and operable thereby, a plurality of abutment means slidably mounted on said support and being movable to limit the movement of said adjusting means to predetermined positions, and selecting means including cam means rotatably mounted on said support and operatively connected to said adjusting means, said selecting means selectively pivoting said adjusting means into engagement with one of said abutment means thereby determining the temperature at which said power element operates said switch means.

3. In a control device, the combination comprising a support having adjusting means movably attached thereto, a temperature responsive power element carried by said adjusting means, switch means operatively connected to said power element and operable thereby, selecting means operatively connected to said adjusting means for causing movement thereof, said adjusting means including an outwardly extending curved portion, abutment means mounted on said support and engaging said curved portion to limit the movement of said adjusting means thereby determining the temperature at which said power element operates said switch means, said abutment means being rectilinearly movable to vary the temperature at which said power element operates said switch means.

4. In a control device, the combination comprising a support having adjusting means pivotally mounted thereon, said adjusting means including an outwardly extending curved portion, a temperature responsive power element carried by said adjusting means, switch means having one element thereof carried by said power element, a pair of abutment means slidably mounted on said support and adapted to engage said curved portion to limit movement of said adjusting means thereby setting the temperature at which said power element operates said switch means, and selecting means including cam means and a dial operatively connected to said cam means for operation of the same, a resilient connection between said cam means and said adjusting means whereby selective rotation of said dial pivots said adjusting means to cause engagement of said curved portion with one of said abutment means, said abutment means being movable to vary the temperature setting selected by rotation of said dial.

5. In a control device, the combination comprising a support having adjusting means pivotally mounted thereon, said adjusting means including an outwardly extending curved portion having upper and lower surfaces, a temperature responsive power element carried by said adjusting means, switch means operatively connected to said power element and operable thereby, a pair of abutment means slidably mounted on said support for engagement with said curved portion to limit movement of said adjusting means thereby setting the temperature at which said power element operates said switch means, one of said abutment means being adapted to engage the upper surface of said curved portion and the other of said abutment means being adapted to engage the lower surface of said curved portion, and selecting means including cam means and a dial operatively connected to said cam means for operating the same, a resilient connection between said cam means and said adjusting means, rotation of said dial to one position pivoting said adjusting means in one direction to cause engagement of said upper surface with said one abutment means, and rotation of said dial to another position pivoting said adjustment means in the other direction to cause engagement of said lower surface with said other abutment means, said abutment means being movable to vary the temperature setting selected by rotation of said dial.

6. In a control device, the combination comprising a support having a plurality of contacts disposed thereon each for connection to an external circuit, adjusting means movably mounted on said support, a temperature responsive power element carried by said adjusting means, switch means operatively connected to said power element and operable thereby, a plurality of abutment means for limiting the movement of said adjusting means to predetermined positions to set the temperature at which said power element operates said switch means, and selecting means selectively engaging one of said contacts to connect an external circuit to said switch means, said selecting means being operatively connected to said adjusting means and moving the same into engagement with one of said abutment means to set the control point temperature at one of a plurality of settings.

7. In a control device, the combination comprising a support having a plurality of contacts disposed thereon each for connection to an external circuit, adjusting means pivotally mounted on said support, a temperature responsive power element carried by said adjusting means, switch means operatively connected to said power element and operable thereby, a plurality of abutment means slidably mounted on said support and limiting the pivotal movement of said adjusting means to predetermined positions to set the temperature at which said power element operates said switch means, and selecting means selectively engaging one of said contacts to connect an external circuit to said switch means, said selecting means being operatively connected to said adjusting means and pivoting the same into engagement with one of said abutment means to set the control point temperature at one of a plurality of predetermined settings, said plurality of abutment means being movable to vary said predetermined settings.

8. In a control device, the combination comprising a support having a plurality of contacts disposed thereon each for connection to an external circuit, adjusting means pivotally mounted on said support, a temperature responsive power element carried by said adjusting means, switch means operatively connected to said power element and operable thereby, a plurality of abutment means slidably mounted on said support and limiting the pivotal movement of said adjusting means to predetermined positions, and selecting means including a portion selectively engageable with said contacts to connect an external circuit to said switch means, said selecting means also including cam means resiliently connected to said adjusting means, said cam means pivoting said curved portion into engagement with one of said abutment means upon movement of said selecting means to one position thereby determining the temperature at which said power element operates said switch means, said cam means pivoting said curved portion into engagement with another of said abutment means upon movement of said selecting means to another position thereby setting another temperature at which said power element operates said switch means, said plurality of abutment means being rectilinearly movable to vary said temperature settings.

9. In a control device the combination comprising a support, adjusting means pivotally mounted on said support and including an outwardly extending curved portion having upper and lower involute surfaces, a temperature responsive power element carried by said adjusting means, switch means operatively connected to said power element and operable thereby, a pair of abutment means movably mounted on said support, one of said abutment means being adapted for engagement with said upper surface, and the other of said abutment means being adapted for engagement with said lower surface, a single linear scale associated with said support, each of said abutment means including indicating means cooperating with said single linear scale to indicate the temperature at which said power element operates said switch means upon engagement of said curved portion with the particular abutment means.

10. The combination of claim 9 wherein said abutment means are rectilinearly movable on said support to vary the respective control point temperatures.

11. A thermostatically responsive control device comprising a support, control switch means mounted upon said support, adjusting means mounted upon said support for movement along a given path relative to said support throughout a given range of movement corresponding to a range of temperatures to which said device is to be responsive, a thermostatically responsive element mounted on said adjusting means in an operative relationship with said control switch means to actuate said control switch means at a selected temperature dependent upon the position of said adjusting means on said given path, a pair of abutment means mounted upon said support for movement along said given path toward and away from said adjusting means, said pair of abutment means being cooperatively engageable with said adjusting means to confine movement of said adjusting means to a selected limited portion of said given range of movement, and cam means on said support for selectively urging said adjusting means into engagement with a selected one of said pair of abutment means.

12. A thermostatically responsive control device as defined in claim 11 wherein each of said pair of abutment means is movable upon said frame independently of the other of said pair of abutment means.

13. A thermostatically responsive control device comprising a support, control switch means mounted upon said support, adjusting means mounted upon said support for movement along a given path relative to said support throughout a given range of movement corresponding to a range of temperatures to which said device is to be responsive, a thermostatically responsive element mounted on said adjusting means in operative relationship with said control switch means to actuate said control switch means at a selected temperature dependent upon the position of said adjusting means on said given path, a pair of abutment means mounted upon said support for movement along said given path toward and away from said adjusting means, said pair of abutment means being alternatively engageable with said adjusting means to confine movement of said adjusting means to a selected limited portion of said given range of movement, cam means on said support operable in a first position to bias said adjusting means into engagement of one of said abutment means and operable in a second position to bias said adjusting means into engagement with the other of said abutment means.

14. The control device as defined in claim 13 further comprising a first set of electrical contacts upon said support, a second set of electrical contacts upon said support, and means on said cam means for electrically connecting said control switch means to said first set of contacts when said cam means is in said first position and for connecting said control switch means to said second set of contacts when said cam means is in said second position.

References Cited in the file of this patent

UNITED STATES PATENTS

| | | |
|---|---|---|
| 827,120 | Rehn | July 31, 1906 |
| 2,210,947 | Myers | Aug. 13, 1940 |
| 2,301,383 | Dillman | Nov. 10, 1942 |
| 2,558,610 | Diekhoff | June 26, 1951 |
| 2,810,045 | Millerwise | Oct. 5, 1957 |
| 2,813,173 | Risacher et al. | Nov. 12, 1957 |
| 2,840,667 | Atchison et al. | June 24, 1958 |
| 2,901,574 | Raab | Aug. 25, 1959 |